INVENTORS
CARL E. ATKINS
ROBERT L. ZIOLKOWSKI
BY
Eyre, Mann & Lucas
ATTORNEYS

TOUCH RESPONSIVE CIRCUIT FOR CONTROL OF A LOAD

Filed Sept. 11, 1961 3 Sheets-Sheet 2

INVENTORS
CARL E. ATKINS
ROBERT L. ZIOLKOWSKI
BY
Eyre, Mann & Lucas
ATTORNEYS

June 7, 1966 C. E. ATKINS ETAL 3,255,380

TOUCH RESPONSIVE CIRCUIT FOR CONTROL OF A LOAD

Filed Sept. 11, 1961 3 Sheets-Sheet 3

INVENTORS
CARL E. ATKINS
ROBERT L. ZIOLKOWSKI
BY
Eyre, Mann & Lucas
ATTORNEYS

United States Patent Office 3,255,380

Patented June 7, 1966

3,255,380
TOUCH RESPONSIVE CIRCUIT FOR CONTROL OF A LOAD

Carl E. Atkins, South Plainfield, and Robert L. Ziolkowski, Great Notch, N.J., assignors to Tung-Sol Electric Inc., a corporation of Delaware Filed Sept. 11, 1961, Ser. No. 137,421
14 Claims. (Cl. 315—297)

The present invention is a continuation-in-part of applicants' copending application Serial No. 110,916, filed May 18, 1961, now abandoned.

The present invention relates to touch controlled circuits and more particularly to circuits for opening or closing a load circuit, such as that of a lamp, in response to touch of an individual.

Various circuits have been devised, usually responsive to body capacity, for remote control of lamp circuits or the like. Prior art circuits of this type have required a large number of elements, have been relatively unreliable, have employed high frequency oscillatory circuits, which create radio interference and have required relatively high standby power. The circuit of the present invention requires small standby energy, includes relatively few parts, is reliable in operation, introduces no hazard to the operator and utilizes only low frequency thereby avoiding any question of interference.

The new circuit comprises in general a low frequency source of signal energy, which is powered from the conventional 115 v. 60 cycle A.C. supply lines, a semiconductor device coupled to said source for normally receiving pulsating energy therefrom, at least one other semiconductor device which is coupled to the first device, an output circuit including a load circuit controlling relay responsive to the condition of said second semiconductor device and means responsive to the touch of an operator for suppressing or curtailing the signal energy delivered to said first device from said source to thereby reverse the condition of the second semiconductor device.

The low frequency source of signal energy, which may be, for example, a relaxation oscillator or a multivibrator, is coupled through two matched high impedances to the first semiconductor device. The element to be touched is connected to the junction of these impedances. The first semiconductor device is preferably a transistor connected as an emitter follower with its base coupled to said source. The second semiconductor device may be, and preferably is, a four zone three terminal germanium PNPN semiconductor device available commercially under the designation 2N1966. Such a device can be triggered into a conductive state by application of a negative pulse to its base. (The inner N-type zone.) The device then continues to conduct much like a thyratron. Unlike a thyratron the device may be triggered to the non-conductive state by application of a poistive pulse to the base terminal.

In some embodiments of the invention the second semiconductor device, hereinafter called the "triggered device" is so connected to the emitter of the transistor as to be normally conducting in which case it is triggered to the non-conducting state upon suppression of the signal pulses. In other embodiments of the invention the triggered device is normally in the non-conductive state and is triggered into the conductive state upon suppression of the signal pulse.

Various alternative arrangements are provided for control of a load circuit in response to change in condition of the triggered device. In certain arrangements, when the triggered device is rendered non-conductive, a stepping relay is energized, the armature of which controls the load circuit. In other arrangements change in condition of the triggered device produces a pulse for triggering a flip-flop circuit, the flip-flop circuit in turn controlling a relay the armature of which controls the load circuit. In still another arrangement when the triggered device is rendered non-conductive a normally deenergized relay is energized to close the load circuit, the relay remaining energized until push button means are closed for rendering the triggered device conductive again.

Alternatively, when the triggered device is rendered non-conductive a normally energized relay releases to close the load circuit and the device remains non-conducting until push button means are operated.

For a better understanding of the invention and of specific circuits embodying the same reference may be had to the accompanying drawings of which:

Figure 1:
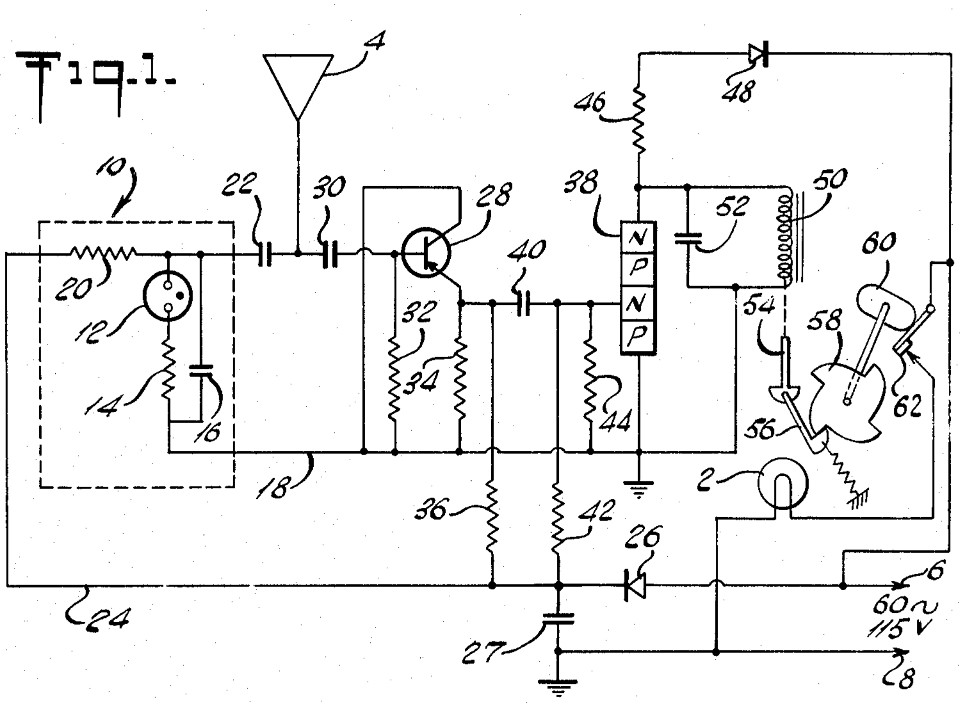
FIG. 1 is a diagram representing a circuit of the invention and showing a lamp circuit controlled from a stepping relay.

Referring now to FIG. 1 a lamp to be controlled is indicated diagrammatically at 2 and symbolically illustrated at 4 as an antenna is a portion of the lamp structure, for example, a metallic ring about the lamp support fixture. Alternating current supply lines of 115 v. 60 cycles are indicated at 6 and 8, line 8 being the grounded line. A relaxation oscillator 10, comprises a neon lamp 12 and resistor 14 connected in parallel with a capacitor 16 between a grounded lead 18 and the junction between a resistor 20 and a capacitor 22, resistor 20 forming part of the relaxation oscillator 10. The other end of resistor 20 is connected to a line 24 which is connected through a diode 26 to the ungrounded power line 6 and through a capacitor to the grounded power line 8.

A transistor 28 has its base connected through a capacitor 30 to capacitor 22. Capacitors 22 and 30 are each preferably small, say about 10 micromicrofarads, and together they provide a high impedance connection between the oscillator 10 and transistor 28. The junction of capacitors 22 and 30 is connected to the antenna 4. The base of transistor 28 is connected to ground through a relatively large resistor 32 and the collector of transistor 28 is connected to grounded lead 18. The emitter of transistor 28 is connected to ground through a resistor 34 and through a larger resistor 36 to the line 24. Thus the emitter of transistor 28 is maintained positive from line 24 relative to the collector and base of that transistor. Hence transistor 28 is normally conducting and pulses from the relaxation oscillator delivered to the base of transistor 28 through capacitors 22 and 30 appear at the emitter terminal. When, however, the antenna 4 is touched by the hand of an operator the signal or pulses from the relaxation oscillator are removed from the base of transistor 28 and accordingly no pulses appear at the emitter of the transistor. The four zone PNPN device illustrated at 38 has its base connected through a capacitor 40 to the emitter of transistor 28. Its base is also biased positively through a connection to line 24 through a large resistor 42 of the order of 2 megohms. A resistor 44 of the order of 2.2 kilohms is connected between the base of the triggered device and ground. The emitter (the end P zone) of device 38 is connected directly to ground and the collector (the end N zone) is connected through a resistor 46 and a diode 48 to the ungrounded power line 6.

A stepping relay having a winding 50 bypassed by a capacitor 52 is connected across the collector and emitter of the triggered device. The stepping relay is shown diagrammatically as including an armature 54 to which is linked a pawl 56 which cooperates with a ratchet wheel 58 to sequentially open and close, through a cam 60, contacts 62 in the circuit of lamp 2. The movable contact 62 is connected to the power line 6 and the fixed contact 62 is connected to the lamp 2, the other lead of the lamp being connected to the power line 8.

The operation of the above described circuit is as follows:

When the antenna 4 is not touched pulses from the relaxation oscillator 10 will be applied through capacitors 22 and 30 to the base of transistor 28. The resulting pulses at the emitter of transistor 28 are impressed through capacitor 44 upon the base of the triggered device 38. During each half cycle of the alternating current source when the ungrounded lead 6 is negative the negative pulses from transistor 28 will render device 38 conducting. As the relay winding is in parallel with the device there will be insufficient voltage across the relay to cause energization and accordingly the relay will remain released. When, however, application of pulses to the base of transistor 28 are removed by touch of the antenna 4 by an operator the positive bias on the base of the triggered device due to the connection to the positive lead 24 through resistor 42 will render the device non-conducting. Accordingly the potential at the collector thereof, due to the provision of the diode 48, will be sufficiently negative to cause energization of the relay. The relay winding 50 will thereupon be energized to raise the armature 54 and rotate ratchet 58 through 90°. Cam 60 will thus be moved to a position to close contacts 62 and light lamp 2. When the hand is removed from antenna 4 the circuit returns to initial condition and the relay releases. The lamp circuit, however, will remain closed because the ratchet 58 will not be moved during the downward movement of the armature. Upon a subsequent touching of the antenna 4 and momentary reenergization of the relay, the ratchet will be stepped to the next position which opens the lamp circuit. Thus in this embodiment of the invention successive touching of the antenna 4 closes and opens the lamp circuit.

Figure 2:
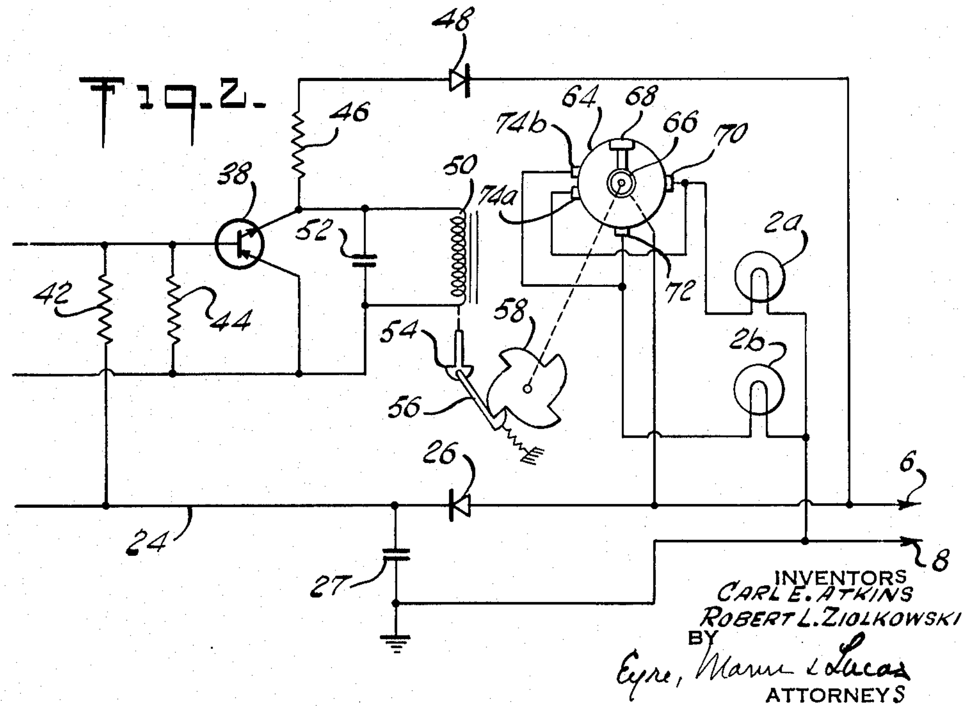
FIG. 2 is a partial diagram showing the circuit of FIG. 1 employed for control of a three-way lamp.

In FIG. 2 only so much of the circuit as is associated with the device 38 is shown as the previous portion of the circuit may be the same as that of FIG. 1. Also device 38 has been shown symbolically. In this embodiment of the invention the load to be controlled may comprise either two lamp filaments within a single bulb or two separate lamps. In the drawing two separate lamps 2_a_ and 2_b_ are shown, 2_a_ being, for example, a 60 watt lamp and 2_b_ a 100 watt lamp. In this embodiment of the invention the ratchet 58 of the stepping relay 50 operates a four position switch comprising a disc 64 of insulating material having an annular metallic insert 66 and an arcuate metallic contact 68 on its periphery, the insert and contact being conductively connected together. Disposed about the periphery of the disc for engagement with contact 68 are four contacts 70, 72, 74_a_ and 74_b_. Contacts 70 and 72 are positioned for consecutive engagement by the disc carried contact 68 when the disc is rotated through 90°. Contacts 74_a_ and 74_b_ are positioned sufficiently close together to be bridged by contact 68 when the disc is rotated through a further angle of 90°. Contact 70 is connected through lamp 2_a_ to the grounded power line 8 and to contact 74_a_. Contact 72 is connected through lamp 2_b_ to the grounded power line 8 and to contact 74_b_. The annular conducting portion 66 of the disc is connected to the ungrounded power line 6. With this arrangement when the relay is energized once to move contact 68 into engagement with contact 70 lamp 2_a_ will be lighted. After the next energization of the relay, contact 68 will engage contact 72 and lamp 2_b_ will be lighted. On the next energization of the relay contact 68 engages both contacts 74_a_ and 74_b_ and both lights will be lighted. Thus in this embodiment of the invention one touch of the antenna will yield low light, a second touch medium light, and a third touch high light. On the fourth touch the lamps will be extinguished.

Figure 3:
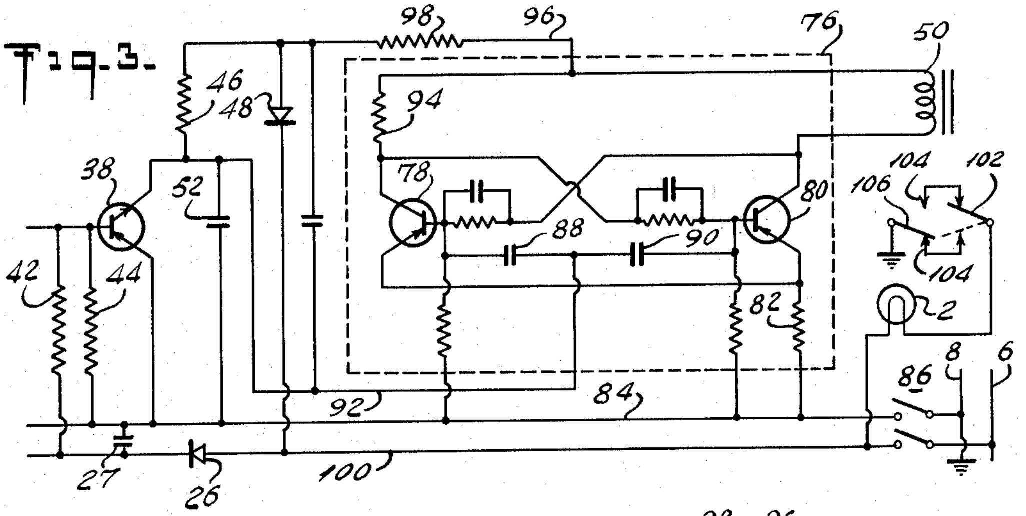
FIGS. 3 and 4 are diagrams illustrating use of a flip-flop circuit for control of the relay.

The circuit of FIG. 3 differs primarily from that of FIGS. 1 and 2 in that instead of a stepping relay a flip-flop circuit 76 is interposed between the relay 50 and device 38. Also in this embodiment of the invention change of condition of the lamp occurs upon removal of the hand of an operator. The flip-flop circuit 76 comprises a pair of transistors 78 and 80 the emitters of which are tied together and connected through a resistor 82 to a line 84 which, through a wall switch 86 is connectable to the grounded power line 8. The collector of transistor 78 is connected through an RC network to the base of transistor 80 and similarly the collector of transistor 80 is connected through an RC network to the base of transistor 78. The bases of transistors 78 and 80 are tied together through two series connected capacitors 88 and 90, the junction of which is connected through a line 92 to the collector terminal of the four zone device 38. The collector of transistor 78 is connected through a resistor 94 to a line 96. The collector of transistor 80 is connected through the winding of relay 50 to line 96. Line 96 is connected through a resistor 98 and diode 48 to line 6 through line 100 and wall switch 86. Lamp 2 is connected between line 100 and the movable arm of a manually operable switch 102, the fixed contacts of which are connected to front and back contacts 104 associated with the grounded armature 106 of the relay.

The operation of the above described circuit will now be described.

When the wall switch 86 is closed the oscillator, not shown in FIG. 3, becomes energized to impress pulses upon the four zone device 38 to render the device conducting. Transistor 78 of the flip-flop circuit will be conducting rather than transistor 80 because of the inductive load occasioned by the relay winding 50 in the collector circuit of transistor 80. With switch 102 in the position shown in solid lines, lamp 2 will not be lighted. When the hand of an operator touches the antenna (not shown in FIG. 3) and the four zone device is thereby rendered non-conductive no change in the condition of the flip-flop circuit takes place. However, upon removal of the hand of the operator, the signal delivered to the base of the four zone device causes that device to become immediately conductive and to thereby impress through lead 92 a strong positive pulse to the bases of the transistors of the flip-flop circuit. Accordingly, transistor 78 will cease to conduct and in so doing will impress a negative pulse upon the base of transistor 80 causing that transistor to conduct. The removal of the hand of the operator therefore causes energization of the relay winding 50 with consequent movement of the armature thereof into engagement with the front contact of the relay. Lamp 2 thereupon lights. The lamp remains lighted until there is a subsequent touch of the antenna and removal of the hand therefrom.

Thus with the switch 102 in the solid line position the lamp cannot be lighted from the wall switch 86 because once the power has been turned off at the switch 86 closure of the circuit does not energize relay 50. If it is desired that the lamp be lighted from the wall switch 86 it is only necessary to place the switch 102 in the dotted line position so that the lamp is lighted over the normally closed back contact of the armature 106. In this arrangement irrespective of whether the lamp had been extinguished by touch and release of the hand or by opening of the wall switch the lamp may be lighted by closing switch 86, if open, or by opening and closing the switch if already closed. With the switch 102 in the dotted line position, however, restoration of power, after a temporary failure causes the lamp to be automatically lighted. The manual switch 102 thus provides the user with the option of control from the wall switch if power failures are unlikely, or insurance against automatic lamp lighting where power failures are frequent.

Figure 4:
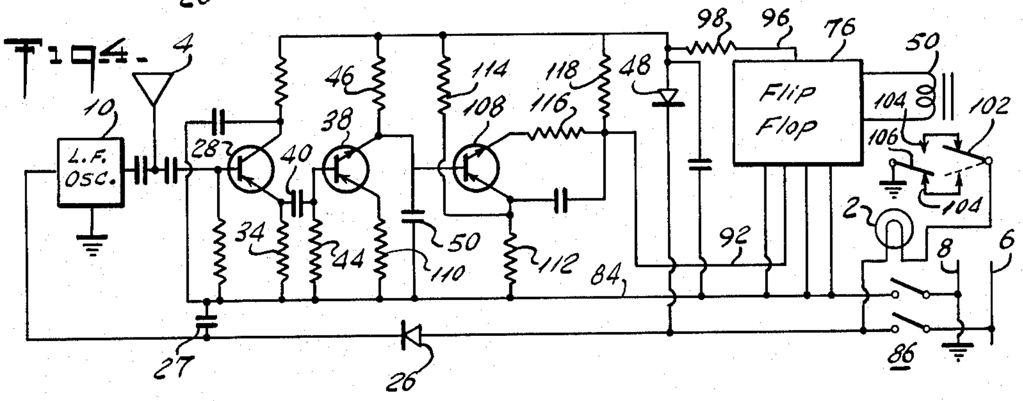

The circuit of FIG. 4 is substantially like that of FIG. 3 except that by the provision of an additional four zone device lighting of the lamp is not delayed until removal of the hand. By the provision of the second four zone device a positive pulse is created for triggering the flip-flop circuit when the hand touches the antenna. The second four zone device of FIG. 4, indicated at 108, is normally non-conducting because its base is connected to the collector of the device 38 and therefore is at a relatively high potential. To provide the proper potential at the base of the four zone device 108 a resistor 110 is inserted in the emitter circuit of the four zone device 38. Otherwise the circuit up to and including device 38 is the same as in FIGS. 1 through 3. The four zone device 108 has its emitter connected to line 84 through a resistor 112 and to the junction of resistors 46 and 98 through a resistor 114. The collector of device 108 is connected through a resistor 116 to line 92 and the junction of line 92 and resistor 116 is connected through a dropping resistor 118 to diode 48. In FIG. 4 the leads to the flip-flop circuit 76 are shown as in FIG. 3 but the elements of the flip-flop circuit have not been separately illustrated. The contacts associated with the armature of relay 50 are connected to the lamp 2 via the manually operable switch 102 as in FIG. 3. It is believed that the operation of the circuit of FIG. 4 will be clear from the description already given of FIG. 3. The only variation is due to the additional four zone device which produces at the collector thereof a positive pulse for triggering the flip-flop circuit when device 38 is rendered non-conductive.

Figure 5:
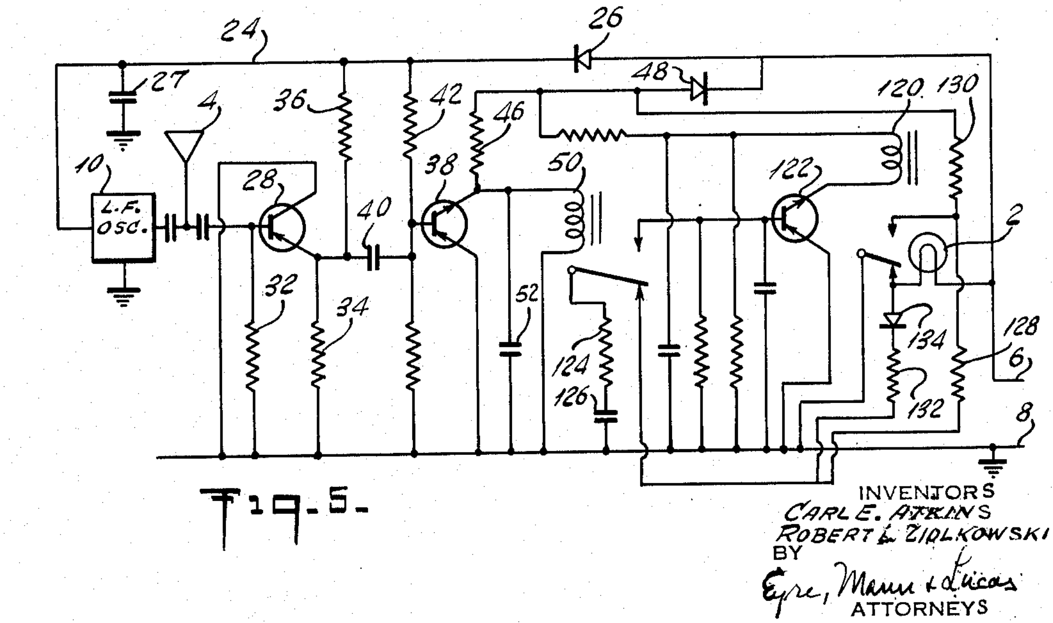
FIGS. 5 and 6 are circuit diagrams illustrating alternative arrangements utilizing two four zone semiconductor devices and a separate relay associated with each.

The embodiment of the invention illustrated in FIG. 5 differs from that of FIG. 4 in that although two four zone devices are employed no flip-flop circuit is required. In this embodiment of the invention two relays are employed. Relay 50 is connected in parallel with the first four zone device 38 as in the circuit of FIGS. 1 and 2 and a relay 120 is connected in series with the second four zone device 122. The armature of relay 50 is connected through a resistor 124 and capacitor 126 to the grounded line 8 and it is the condition of charge of this capacitor 126 which determines whether or not the four zone device 122 will conduct. The back, or normally closed, contact associated with the armature of relay 50 is connected through two-series connected high resistors, 128 and 130, each of the order of one megohm, to the anode of diode 48. The back, or normally closed, contact of the armature of relay 50 is also connected through a high resistor 132, also of the order of one megohm, to the cathode of a diode 134 the anode of which is connected to the back, or normally closed, contact associated with the armature of relay 120. The armature of relay 120 is connected to the grounded lead 8 of the power lines. Thus when both relays are deenergized capacitor 126 is charged negatively with respect to ground because it is connected to a point in the circuit which can be traced as follows: From ground through the armature of relay 120, diode 134, resistors 132, 128, 130 and diode 48 to the ungrounded power line 6. When relay 120 is energized and relay 50 deenergized, capacitor 126 will be charged positively because it is connected to ground through resistor 128 and the front contact and armature of relay 120.

The lamp 2 is connected between line 6 and the normally closed back contact associated with the armature of relay 120 so that upon connection of power to the circuit the lamp 2 will initially light and will stay lighted until relay 120 is energized. The four zone device 38 is normally energized as a result of the signal from the low frequency oscillator 10. When the hand of the operator touches the antenna 4 the four zone device 38 is blocked and relay 50 is energized. The negative charge on capacitor 126 is then impressed upon the base of the four zone device 122 causing that device to become energized and to thereby energize the relay 120. The armature of relay 120 moves into engagement with its front contact and opens the lamp circuit. When the hand of the operator is removed relay 50 becomes deenergized but the relay 120 will continue to be energized keeping the lamp circuit open. Capacitor 126 now begins to charge positively as heretofore described. On the next touch of the operator when relay 50 energizes a positive pulse is impressed upon the base of device 122 causing that device to become non-conductive and relay 120 to release. The lamp circuit thereupon is closed and remains closed after the operator has removed his hand and relay 50 has become deenergized.

Thus with the above described circuit the lamp will be alternately lighted and extinguished with successive touching of the antenna.

Although no wall switch has been indicated in FIG. 5 it will be apparent that this circuit is adapted for control therefrom as when the power is first turned on the lamp will promptly light because it is connected over the back or normally closed contact of the normally deenergized relay 120. Should, however, the wall switch be closed and the lamp extinguished by the operator the lamp would light following a power failure when the power is restored.

Figure 6:
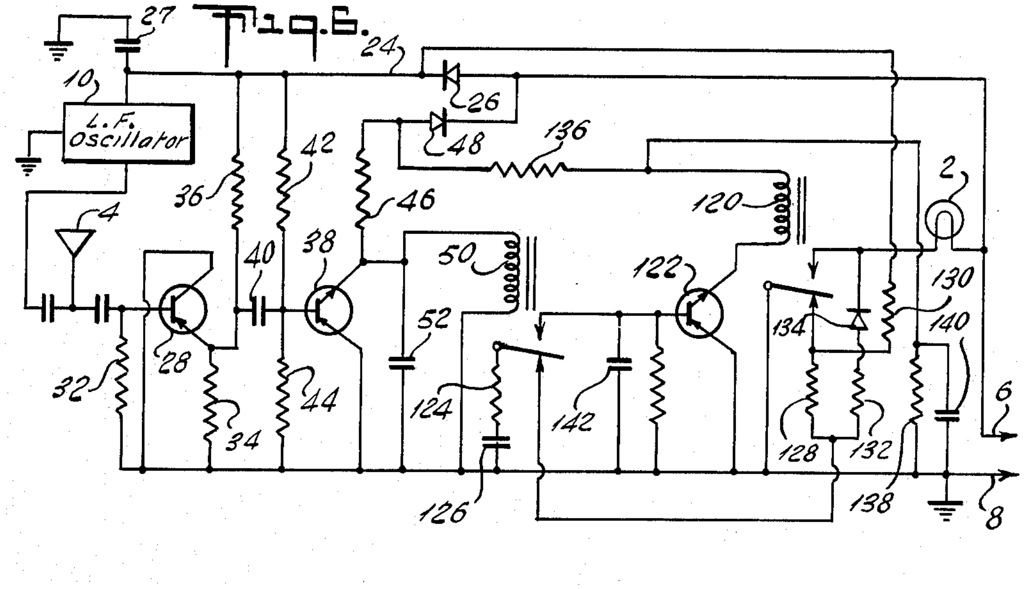

In the circuit of FIG. 6 now to be described restoration after a power failure would not occasion lighting of the lamp. In FIG. 6 the various elements are identified by the same reference numerals as heretofore employed. The circuit differs from that of FIG. 5 primarily in that lamp 2 is connected to the normally front or open contact associated with the armature of relay 120 and the normally closed back contact of the relay is connected to the junction of resistors 130 and 128. The diode 134 has its cathode connected to the normally open contact of relay 120 and its anode connected through resistor 132 to the normally closed back contact of relay 50. The winding of relay 120 is connected through a resistor 136 and diode 48 to line 6. A resistor 138, bypassed by a capacitor 140 is connected between ground and the junction of winding 120 and resistor 136. A capacitor 142 connected between ground and the base of the four zone device 122 prevents that device from becoming conductive when a sudden surge of power appears on the line. A similarly located capacitor in the circuit of FIG. 5 serves the same purpose.

Relays 50 and 120 as in the circuit of FIG. 5 are normally non-conducting. In this condition capacitor 126 is charged negatively because it is connected through the armature of relay 50 to a point in the following series circuit: ground, back contact of relay 120, resistors 128 and 132, diode 134, lamp 2 and line 6. When the armature of relay 50 picks up as a result of a touch of the hand of an operator on antenna 4, device 122 is made conductive by the negative pulse from capacitor 126. Lamp 2 is thereupon lighted and relay 120 remains energized after the hand has been removed and relay 50 becomes deenergized. In this situation capacitor 126 charges positively over the following circuit: line 6, diode 26, resistors 130, 128 and 132, diode 134 and ground. Consequently on the next touch of the antenna when relay 50 picks up its armature, a positive pulse will be impressed upon the base of device 122 to cause deenergization thereof and release of the armature of relay 120 with extinguishment of the lamp 2.

Figure 7:
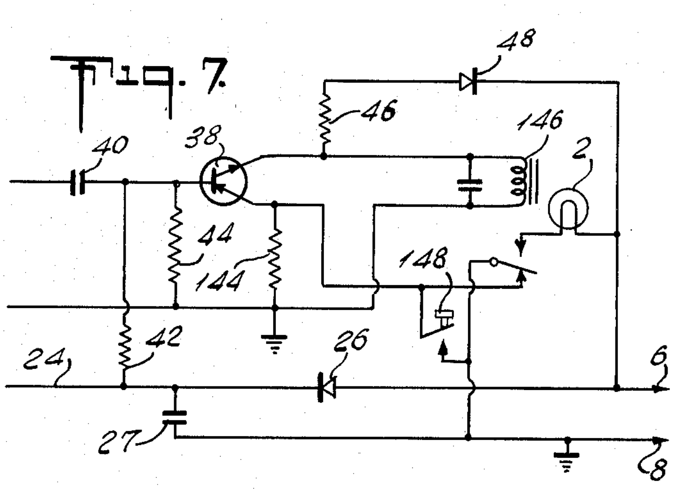
FIGS. 7 and 8 are diagrams illustrating the use of push button means for opening the lighting circuit and for restoring the control circuit to initial conditions.

In the circuit of FIG. 7 manual means are shown for opening the lamp circuit and restoring the triggered device to a conductive state. In this embodiment of the invention a bias resistor 144 is connected between the emitter of device 38 and ground. A ground connection is provided for the emitter over the back contact of the armature of a relay 146. The relay is connected between the collector of device 38 and ground and hence is normally deenergized. When the antenna is touched and the device rendered non-conductive, the relay is energized to pick up its armature and close the circuit of lamp 2. In picking up its armature it opens the ground circuit of the trigger device and inserts the resistor 144 into the emitter circuit. Accordingly the negative bias impressed on the emitter prevents the device from becoming conductive after the hand has been removed from the antenna. Thus the lamp circuit will remain closed. In order to open the lamp circuit a push button switch 148 is provided which when operated grounds the emitter and therefore permits the trigger device to again become conductive and in so doing to release the relay which thereupon closes the ground holding circuit of the emitter. As the contacts of switch 148 do not have to carry large current, a relatively inexpensive switch may be used.

Figure 8:
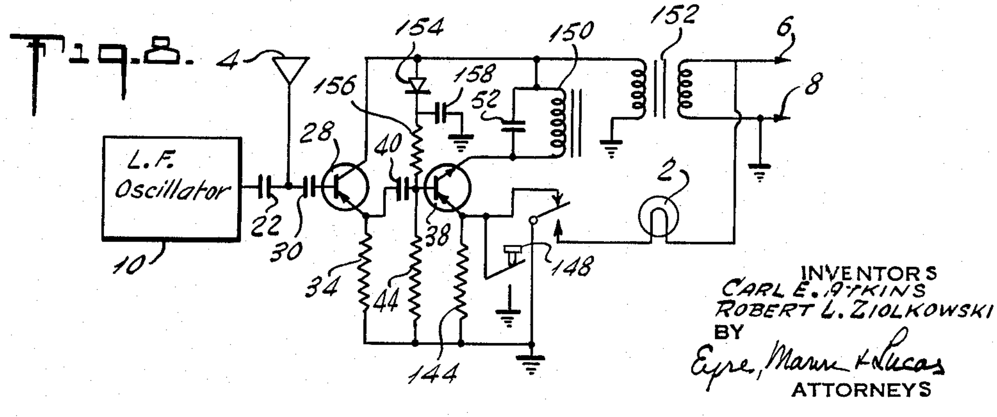

The circuit of FIG. 8 differs from certain of the previous circuits in that the relay 150 thereof is in series with the trigger device and not in parallel. In this embodiment of the invention device 38 and the relay are normally energized. A low frequency oscillator, indicated in block form at 10, may be the relaxation oscillator shown in FIG. 1 or it may be a transistor multivibrator circuit or any other source of low frequency signals. The emitter of device 38 is connected to ground through resistor 144 as in the circuit of FIG. 7 and is connected through the top contact of the armature of relay 150 to ground. A step-down transformer 152 coupled to the lines 6 and 8 is provided in order to protect the trigger device from application of too high a voltage when not conducting. Positive bias is impressed upon the base of device 38 through a diode 154 and a resistor 156. A capacitor 158 is connected between the cathode of the diode and ground. The lamp 2 is connected between the ungrounded power line 6 and the back contact associated with the armature of relay 150. The push button switch 148 is provided for grounding the emitter of device 38 when the lamp circuit is to be opened.

In this embodiment of the invention, when the circuit is first plugged in with relay 150 deenergized, the lamp will light but when push button 148 grounds the emitter of device 38, the device becomes conducting to cause energization of the relay and closure of the ground circuit of the emitter. Accordingly the device will remain energized until the antenna 4 is touched to suppress the signal to transistor 28.

The invention has now been described in connection with various embodiments thereof. It will be apparent that the invention provides a simple low frequency system of great versatility in that it may be employed for control of a load circuit by successive touching of a single element or for closing a load circuit by touching one element and opening the circuit by operating a push button. Various types of oscillatory circuits may be provided and utmost safety of the operator is insured. The use of low frequency avoids any possibility of interference with other appliances.

As the invention is particularly designed for control of a lamp load, the load in each of the circuit diagrams has been illustrated as a lamp or lamps. Obviously the inventiton is not directed to the specific load circuit to be controlled but only to the novel control circuit therefor. Various changes could be made to the specific circuits diagrammatically illustrated without departing from the principle of the invention. For example, although the described PNPN trigger device is preferred because of its sensitivity and rapidity of response, other trigger devices, or even transistors could be employed. Also although in the preferred embodiment of the invention a transistor is provided for reception of the signal pulses and control of the trigger device, such transistor could be replaced by a trigger device such as the NPNP device 38 or, if desired, additional transistor or trigger device stages could be provided between the low frequency signal source and the load circuit. Means other than those specifically described could be provided for maintaining the conditions of the load circuit after triggering of the trigger device. For example, instead of stepping relays, latching relays with manual release means could be provided or, in the case of a lamp load, light responsive means could be provided for maintaining the lamp load circuit closed. Other alternative arrangements will occur to those skilled in the art.

The following is claimed:

1. A touch responsive circuit for control of a load circuit comprising in combination a low frequency oscillator, a normally conducting semiconductor device coupled through a reactive impedance to said oscillator for reception of pulsating energy therefrom, an element connected to said oscillator and to said device through said reactive impedance adapted when touch to suppress application of pulsating energy to said device, a normally conducting semiconductor triggered device coupled to said first device for triggering thereby from a conductive to a non-conductive condition when said element is touched and means responsive to change in condition of said triggered device for controlling a load circuit.

2. A touch responsive circuit for control of a load circuit comprising in combination a low frequency oscillator, a normally conducting semiconductor device coupled through a reactive impedance to said oscillator for reception of pulsating energy therefrom, an element connected to said oscillator and to said device through said reactive impedance adapted when touched to suppress application of pulsating energy to said device, a normally conducting semiconductor triggered device coupled to said first device for triggering thereby from a conductive to a non-conductive condition when said element is touched, means responsive to change in condition of said triggered device for controlling a load circuit, said last mentioned means including a stepping relay having a winding connected across said triggered device so as to be energized when said triggered device is non-conductive, said relay having an armature mechanically coupled to a switch in the load circuit, said switch being a four position switch and the load circuit including two branches each having a lamp therein, said switch in one position holding both branches open, in a second position closing one branch, in a third position closing the other branch and in the fourth position closing both branches whereby successive touching of said element can control the degree of illumination in the load circuit.

3. The circuit according to claim 1 wherein said triggered device is a three terminal four zone PNPN germanium device having its inner N zone coupled to said first semiconductor device.

4. The circuit according to claim 3 wherein said first mentioned semiconductor is a transistor having base, collector and emitter terminals, said base terminal being connected to said oscillator and to said element through said reactive impedance and said emitter terminal being connected to the inner N zone of said triggered device.

5. The circuit according to claim 1 wherein said last mentioned means includes a flip-flop circuit coupled to said triggered device for reversal when said triggered device is triggered and wherein a relay having a two position armature adapted in one position to close the load circuit is connected to said flip-flop circuit for energization in one condition thereof.

6. The circuit according to claim 5 wherein said flip-flop circuit reverses when a positive voltage pulse is impressed thereon and wherein said triggered device produces a positive pulse for delivery to said flip-flop circuit when triggered to a conductive condition, whereby said flip-flop circuit reverses when said triggered device resumes its normally conductive condition following touch of said element.

7. The circuit according to claim 5 wherein said flip-flop circuit reverses when a positive voltage pulse is impressed thereon and wherein said flip-flop circuit is coupled to said triggered device through the intermediary of a second triggered device which is normally non-conducting and triggered into a conductive state when said first mentioned triggered device is rendered non-conductive by touch of said element, said second triggered device delivering a positive pulse to said flip-flop circuit when triggered to a conductive state whereby said flip-flop circuit reverses when said element is touched.

8. The circuit according to claim 1 wherein said last mentioned means includes a normally deenergized relay having an armature adapted to close the load circuit when the relay is energized and normally shunting the relay by said triggered device, said triggered device being normally energized through a circuit including said armature whereby when said element is touched to trigger said device to the non-conductive condition said relay is energized and moves its armature to open the shunt circuit of said triggered device and to close the load circuit, and push button means for closing said shunt circuit for triggering said triggered device to the conductive state with consequent deenergization of the relay and restoration of the shunt circuit over the armature thereof.

9. The circuit according to claim 1 wherein said last mentioned means includes a relay having a winding connected in series with said triggered device so as to be energized when said device is conducting, said relay having an armature adapted, when the relay releases, to close the load circuit, a biasing resistor connected to said triggered device to prevent conduction therethrough, manually operable means for shunting said resistor to render said triggered device conductive and to energize the relay, said armature, when the relay is energized, holding said resistor shunted.

10. The circuit according to claim 1 wherein said low frequency oscillator is a relaxation oscillator.

11. A touch responsive circuit for control of a load circuit comprising in combination a low frequency oscillator, a normally conducting semiconductor device coupled through a reactive impedance to said oscillator for reception of pulsating energy therefrom, an element connected to said oscillator and to said device through said reactive impedance adapted when touched to suppress application of pulsating energy to said device, first and second semiconductor triggered devices, each having a trigger electrode which when pulsed with pulses of a given polarity renders the device conductive and when pulsed with pulses of opposite polarity renders the device non-conductive, a first relay having a winding connected in parallel with said first triggered device and an armature connected to charge storing means and movable between a front contact connected to the trigger electrode of said second triggered device and a back contact, a second relay having a winding connected in series with said second triggered device and having an armature connected to a fixed potential and movable between front and back contacts of which one is in the circuit to be controlled, circuit means coupling said last mentioned front and back contacts with the back contact associated with the armature of said first relay for charging said charge storing means with a charge of given polarity when both of said relays are deenergized and for charging said charge storing means oppositely when said first relay is deenergized and said second relay energized, whereby when a source of operating energy is coupled to said circuit the relays are initially deenergized, said charge storing means is charged with a charge of said given polarity, said first triggered device is rendered conductive by pulsating energy from said low frequency oscillator and the trigger electrode of said second triggered device is disconnected from said charge storing device and when said element is touched said first triggered device is rendered non-conductive, said first relay is energized to pick up its armature for connecting said charge storing device to the trigger electrode of said second triggered device, which second device and the second relay become energized and said charge storing means becomes charged to a polarity opposite to said one polarity to render said second trigger device non-conductive when said element is next touched.

12. The touch responsive circuit according to claim 11 wherein the load is connected to the back contact of the armature of said second relay whereby when power is first applied to said circuit said load is energized.

13. The touch responsive circuit according to claim 11 wherein each of said triggered devices is a four zone PNPN device of which the inner N zone is the trigger electrode.

14. A touch responsive circuit for control of a load comprising a source of operating energy, a low frequency oscillator energized from said source, a semiconductor triggered device connected through a reactive impedance to said source and normally maintained conductive by pulsating energy from said oscillator, an element adapted when touched to suppress delivery of pulsating energy from said oscillator to said trigged device, a relay connected to said source and to said device and adapted to be energized when said device is rendered non-conductive, a second triggered device connected to said source and normally non-conducting, a second relay connected to said source and to said second device and adapted to be energized when said second device is rendered conductive, said second relay controlling the load circuit, and circuit elements interconnecting said relays to cause said second triggered device to be alternately rendered conductive and non-conductive with successive energization of said first relay.

References Cited by the Examiner

UNITED STATES PATENTS

| | | | |
|---|---|---|---|
| 2,290,771 | 7/1942 | Shepard | 328—208 X |
| 2,810,066 | 10/1957 | Green | 240—123 |
| 2,852,702 | 9/1958 | Pinckaers | 317—148.5 |
| 2,896,131 | 7/1959 | Schumann | 340—238 |
| 2,913,599 | 11/1959 | Benton | 317—148.5 |
| 3,109,965 | 11/1963 | Winchell | 317—148.5 |

HERMAN KARL SAALBACH, *Primary Examiner.*

ARTHUR GAUSS, S. CHATMON, Jr.,
*Assistant Examiners.*